US 6,731,745 B1

(12) United States Patent
Goto

(10) Patent No.: US 6,731,745 B1
(45) Date of Patent: May 4, 2004

(54) FREQUENCY DEVIATION DETECTING APPARATUS AND FREQUENCY DEVIATION DETECTING METHOD

(75) Inventor: Koji Goto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/422,062

(22) Filed: Oct. 21, 1999

(30) Foreign Application Priority Data

May 10, 1999 (JP) .......................................... 11-128428

(51) Int. Cl.⁷ ............................ H04M 3/00; H04M 5/00
(52) U.S. Cl. ...................................... 379/283; 375/275
(58) Field of Search ................................ 375/229, 240, 375/275; 379/386, 283, 282; 708/312

(56) References Cited

U.S. PATENT DOCUMENTS 5,408,529 A * 4/1995 Greaves ...................... 379/386
5,644,634 A * 7/1997 Xie et al. .................... 379/386
6,370,244 B1 * 4/2002 Felder et al. ................ 379/386

FOREIGN PATENT DOCUMENTS

JP 55-141853 11/1980
JP 4-309871 11/1992

OTHER PUBLICATIONS

"DTMF Tone Generation and Detection An Implementation Using the TMS320C54x", *Texas Instruments*, pp. 4–12, 1997.

\* cited by examiner

*Primary Examiner*—Stephen Chin
*Assistant Examiner*—Curtis Odom
(74) *Attorney, Agent, or Firm*—Leydig, Voit & Mayer, Ltd.

(57) ABSTRACT

A frequency deviation detecting apparatus for detecting frequency deviation of a dual tone multiple frequency (DTMF) signal includes frequency deviation analyzers for analyzing a received signal for frequency components proximate fixed frequencies in analytical blocks, each analytical block having a length that ensures the precision required for detecting the frequency deviation. Each of the analytical blocks of the deviation analyzers partially overlays an adjacent block so that analysis by at least one analytical block is ensured within a minimum duration of a DTMF signal.

9 Claims, 16 Drawing Sheets

FIG.13

| SYMBOL | LOW FREQUENCY GROUP (Hz) | HIGH FREQUENCY GROUP (Hz) |
|---|---|---|
| 1 | 697 | 1209 |
| 2 | 697 | 1336 |
| 3 | 697 | 1477 |
| 4 | 770 | 1209 |
| 5 | 770 | 1336 |
| 6 | 770 | 1447 |
| 7 | 852 | 1209 |
| 8 | 852 | 1336 |
| 9 | 852 | 1477 |
| 0 | 941 | 1209 |
| * | 941 | 1336 |
| # | 941 | 1477 |
| A | 697 | 1633 |
| B | 770 | 1633 |
| C | 852 | 1633 |
| D | 941 | 1633 |

FREQUENCY DEVIATION DETECTING APPARATUS AND FREQUENCY DEVIATION DETECTING METHOD

FIELD OF INVENTION

The present invention relates to a frequency deviation detecting apparatus and a frequency deviation detecting method for detecting frequency deviation of a DTMF signal. This invention relates more particularly to a frequency deviation detecting apparatus and a frequency deviation detecting method for detecting frequency deviation of a DTMF signal with high precision.

BACKGROUND OF THE INVENTION

As a signaling used for a push-button telephone set, there are DTMF (Dual Tone Multi Frequency) recommended by ITU (International Telecommunication Union), Q22, Q23, and Q24. In the DTMF, one frequency is selected out of the four frequencies in a low frequency group (697, 770, 852, and 941 Hz) and four frequencies in a high frequency group (1209, 1336, 1447, and 1633 Hz) respectively and the selected frequencies are added to generate a DTMF signal. FIG. 13 is a view showing symbols represented by combinations of the low frequency group and high frequency group based on the conventional technology. As shown in the figure, the DTMF has 16 symbols (shown in the row of symbol in this figure) based on combinations of the low frequency group and the high frequency group of a DTMF signal.

When a DTMF signal is to be received, frequency deviation, twist, and a signal level or the like of the signal are checked, and if the signal satisfies certain standards, it is recognized as a DTMF signal. Herein, frequency deviation is a value indicating by what percent a frequency mainly included in a received signal is deviated as compared to the prescribed low frequency group and high frequency group. If the frequency deviation is below 1.8%, the signal is received as a DTMF signal, but if the frequency deviation is more than 3.0%, the signal is not received as a DTMF signal.

Furthermore, there are restrictions such that a signal with a minimum duration (40 msec), but not less than 24 msec, is not received. For example, when the frequency of a received signal is to be analyzed for detecting frequency deviation, it is required to set analytical blocks for analysis so that at least one analytical block is ensured within the minimum lifetime of a DTMF signal, considering deviation between start of the received signal and start of the analytical blocks because there is no synchronization between the received signal and analysis. Namely, it is required to maintain a certain throughput of analysis within the restrictions of the specifications of DTMF. Conventionally, analysis is carried out in an analytical block with about 105 samples (13 msec) of a sound signal at an 8-kHz sampling rate.

As a conventional type of frequency deviation detecting apparatus for detecting frequency deviation of a DTMF signal, there is a DTMF receiver which analyzes frequencies of a prescribed number of samples of received signals, for example, around 105 samples at 8 kHz sampling rate on eight prescribed frequencies (four frequencies in the low frequency group and four frequencies in the high frequency group) to extract the frequency components, and detects the frequency deviation from each signal strength of the frequency components.

FIG. 14 is a block diagram showing general configuration of the conventional DTMF receiver. The conventional DTMF receiver comprises a frequency analyzer 1 for analyzing frequency components of a received signal; and a DTMF signal determining unit 3 for receiving the results of analysis regarding the frequency components from the frequency analyzer 1, checking the frequency deviation, the twist, and the signal level or the like to determine whether the signal is a DTMF signal or not. The DTMF signal determining unit 3 outputs, when it is determined that the signal is a DTMF signal, information according to any combination of the low frequency group and high frequency group to a 5-bit bus 2.

The frequency analyzer 1 comprises a frequency detector 11 for detecting strength of a 697 Hz frequency component, a frequency detector 12 for detecting strength of a 770 Hz frequency component, a frequency detector 13 for detecting strength of a 852 Hz frequency component, a frequency detector 14 for detecting strength of a 941 Hz frequency component, a frequency detector 15 for detecting strength of a 1209 Hz frequency component, a frequency detector 16 for detecting strength of a 1336 Hz frequency component, a frequency detector 17 for detecting strength of a 1447 Hz frequency component, and a frequency detector 18 for detecting strength of a 1633 Hz frequency component.

In this DTMF receiver, each of the frequency detectors 11–18 provided in the frequency analyzer 1 receives a signal, subjects the signal to DFT (Discrete Fourier Transform) for each of the prescribed frequencies (697, 770, 852, 941, 1209, 1336, 1447, and 1633 Hz) with a method that uses the Goertzel algorithm, and detects strength of each frequency component. The Goertzel algorithm is an algorithm which performs DFT similarly to a FFT (Fast Fourier Transform) algorithm, and is advantageously used when only a limited number of frequency components are to be detected. Generally in DFT, longer analytical blocks lead to higher frequency precision.

The DTMF signal determining unit 3 receives results of analysis of the frequency components of the received signal, namely receives each strength of the frequency components detected by the frequency detectors 11–18 for comparison. FIG. 15 is a graph showing an example of a conventional type of received signal. In the example of FIG. 15, 697 Hz represents the highest strength of the low frequency group (LG), while 1336 Hz represents the highest strength of the high frequency group (HG). Therefore, it can be estimated that the received signal is a DTMF signal based on a combination of 697 Hz and 1336 Hz. Frequency deviation, signal strength, and twist or the like of the 697 Hz and 1336 Hz frequency components are checked, and it is determined whether the signal is a DTMF signal or not according to the specifications. Herein, frequency deviation can be computed by using the fact that the strength of frequency components in prescribed frequencies is reduced if frequency deviation is larger, in other words, if a peak of the strength of the frequency components is more deviated from the prescribed frequencies.

FIG. 16 is an explanatory view showing the operation of the conventional type of DTMF receiver. In the operation of the conventional type of DTMF receiver, the frequency analyzer 1 performs frequency analyses of a received signal in each analytical block having 105 samples (about 13 msec) at 8 kHz sampling rate continuously, as in the analytical block 0 to the analytical block 4. Namely, the analytical blocks are linked to each other such that the analytical block 0 is checked and then the analytical block 1 is checked. The DTMF signal determining unit 3 receives the result of analysis of the frequency components from the frequency analyzer 1 for 105 samples, checks the frequency deviation, the twist, and the signal level or the like, and determines whether the signal is a DTMF signal or not.

With the above mentioned conventional technology, however, analysis is carried out in a short analytical block, for example with 105 samples (about 13 msec) at 8 kHz sampling rate, and frequency deviation is estimated only from the strength of the frequency components at prescribed frequencies. Therefore sufficient precision in detecting prescribed frequency deviation of 1.8% can not be obtained and there are some cases where appropriate frequency deviation can not be detected. Furthermore, analysis is carried out in continuous analytical blocks, therefore when analysis is to be performed in a sufficiently long analytical block, there occurs a case where at least one analytical block can not be ensured within the minimum lifetime of a DTMF signal.

SUMMARY OF THE INVENTION

It is an object of the present invention to obtain, for the purpose of solving the problems described above, a frequency deviation detecting apparatus which can detect appropriate frequency deviation by ensuring sufficient precision to detect prescribed frequency deviation while at least one analytical block is ensured within the minimum lifetime of a DTMF signal.

In the present invention, the received signal is analyzed for frequency components around the prescribed frequencies in a plurality of analytical blocks each having a length that ensures the precision required for detecting the prescribed frequency deviation, and the analytical blocks are displaced from and overlaid with each other so that at least one analytical block is ensured within the minimum lifetime of a DTMF signal.

Further, in the present invention, the received signal is analyzed for frequency components of a plurality of prescribed frequencies, which combination of a high frequency group with a low frequency group forming the prescribed frequency is mainly included in a received signal is detected, and only components of frequencies around the detected high frequency group and low frequency group are analyzed for detection of frequency deviation.

Further, in the present invention, the displacement between the analytical blocks for detection of frequency deviation is around 105 samples at 8 kHz sampling rate, and a length of the analytical block is around 150 samples at 8 kHz sampling rate.

Further, in the present invention, the received signal is analyzed for frequency components of a plurality of prescribed frequencies in an analytical block with around 60 samples at 8 kHz sampling rate that is longer enough to detect which frequency component of the prescribed frequency is included in the signal and is shorter than the analytical block based on the conventional technology.

In the method of the present invention, a received signal is analyzed for components of frequencies around a prescribed frequency in a plurality of analytical blocks each having a length that ensures the precision required for detecting the prescribed frequency deviation, and the plurality of analytical blocks are displaced from and overlaid with each another so that at least one analytical block is ensured within the minimum lifetime of a DTMF signal.

Further, in the present invention, the received signal is analyzed for frequency components of a plurality of prescribed frequencies, which combination of a high frequency group with a low frequency group forming the prescribed frequency is mainly included in the received signal is detected, and only components of frequencies around the detected high frequency group and low frequency group are analyzed for detection of frequency deviation.

Other objects and features of this invention will become understood from the following description with reference to the accompanying drawings.

BRIEF DESCRIPTION OF THE DRAWINGS

FIG. 13 is a view showing symbols represented by combinations of the low frequency group and high frequency group based on the conventional technology;

DESCRIPTION OF THE PREFERRED EMBODIMENTS

Detailed description is made hereinafter for the preferred embodiments of a frequency deviation detecting apparatus and a frequency deviation detecting method according to the present invention with reference to the attached drawings.

Figure 1:
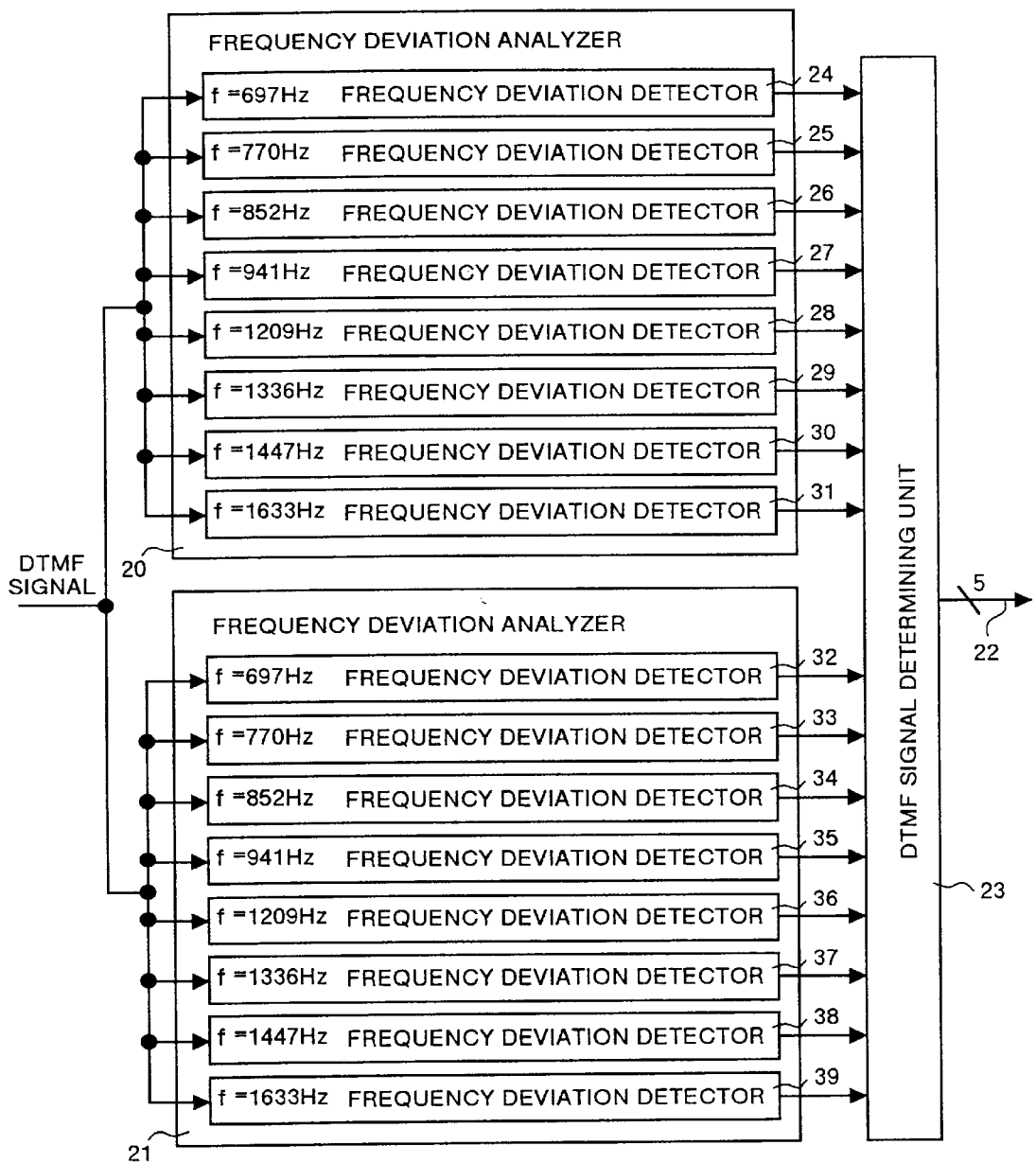
FIG. 1 is a block diagram showing a general configuration of a frequency deviation detecting apparatus according to Embodiment 1 of the present invention.

FIG. 1 is a block diagram showing a general configuration of a frequency deviation detecting apparatus according to Embodiment 1 of the present invention. A DTMF (Dual Tone Multi Frequency) receiver (frequency deviation detecting apparatus) according to Embodiment 1 comprises a frequency deviation analyzer 20 and a frequency deviation analyzer 21, each for performing frequency analysis of a received signal and detecting signal strength and frequency deviation of prescribed DTMF frequencies (697, 770, 852, 941, 1209, 1336, 1447, and 1633 Hz); and a DTMF signal determining unit 23 for receiving the results of detection from the frequency deviation analyzer 20 and frequency deviation analyzer 21 to check the frequency deviation, the twist, and the signal level or the like. The DTMF signal determining unit 23 determines whether the signal is a DTMF signal or not, and outputs the information according to any combination of a low frequency group and a high frequency group to a 5-bit bus 22 when it is determined that the signal is a DTMF signal.

The frequency deviation analyzer 20 comprises frequency deviation detectors 22–27 for detecting signal strength and frequency deviation of a low frequency group frequencies (697, 770, 852, 941 Hz); and frequency deviation detectors 28–31 for detecting signal strength and frequency deviation of a high frequency group frequencies (1209, 1336, 1447, and 1633 Hz). Similarly, the frequency deviation analyzer 21 comprises frequency deviation detectors 32–35 for detecting signal strength and frequency deviation of the low frequency group frequencies; and frequency deviation detectors 36–39 for detecting signal strength and frequency deviation of the high frequency group frequencies.

Figure 2:
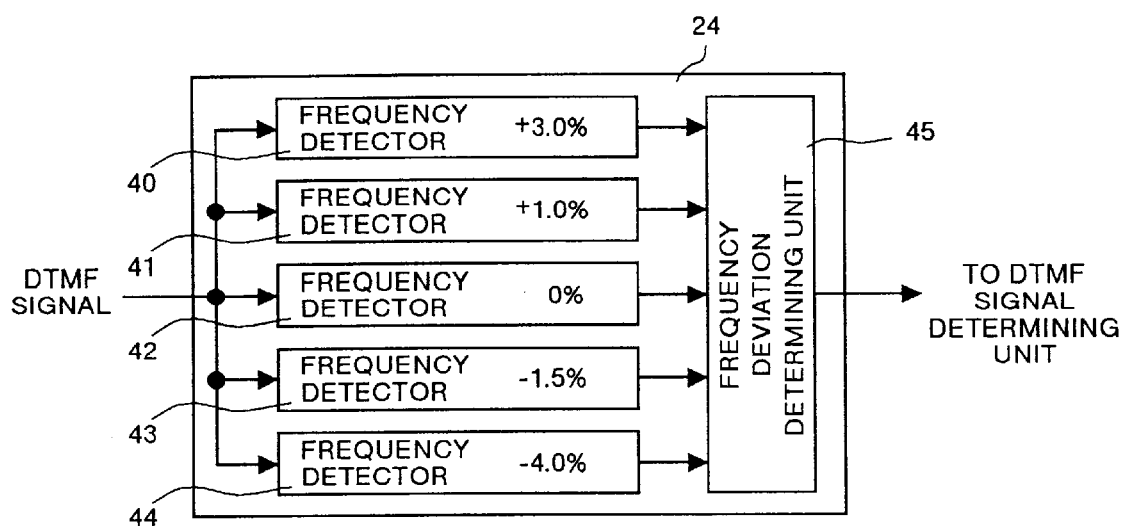
FIG. 2 is a block diagram showing general configuration of a frequency deviation detector for detecting signal strength and frequency deviation of a low frequency group according to Embodiment 1.

FIG. 2 is a block diagram showing general configuration of the frequency deviation detector for detecting signal strength and frequency deviation of the low frequency group according to Embodiment 1. The frequency deviation detectors 24 to 27, 32 to 35 for detecting signal strength and frequency deviation of the low frequency group have the same configuration as each other, and each has a plurality of frequency detectors for detecting signal strength of a prescribed frequency as well as of frequencies around the frequency; and a frequency deviation determining unit for determining whether each frequency deviation is within the prescribed frequency deviation allowed in DTMF specifications or not.

For example, the frequency deviation detector 24 comprises a frequency detector 40 for subjecting a frequency increased by 3.0% of the prescribed frequency 697 Hz, namely 697×1.03=717.91 Hz, to DFT (Discrete Fourier Transform) using the Goertzel algorithm to detect signal strength thereof. Similarly, the frequency deviation detector 24 comprises a frequency detector 41 for detecting signal strength of a frequency increased by 1.0% of the prescribed frequency 697 Hz; a frequency detector 42 for detecting signal strength of the prescribed frequency 697 Hz; a frequency detector 43 for detecting signal strength of a frequency subtracted by 1.5% from the prescribed frequency 697 Hz; a frequency detector 44 for detecting signal strength of a frequency subtracted by 4.0% from the prescribed frequency 697 Hz; and a frequency deviation determining unit 45 for determining whether frequency deviation in the prescribed frequency 697 Hz of the received signal is within the prescribed frequency deviation allowed in DTMF standards or not from the results of detection by the frequency detector 40 to frequency detector 44.

Figure 3:
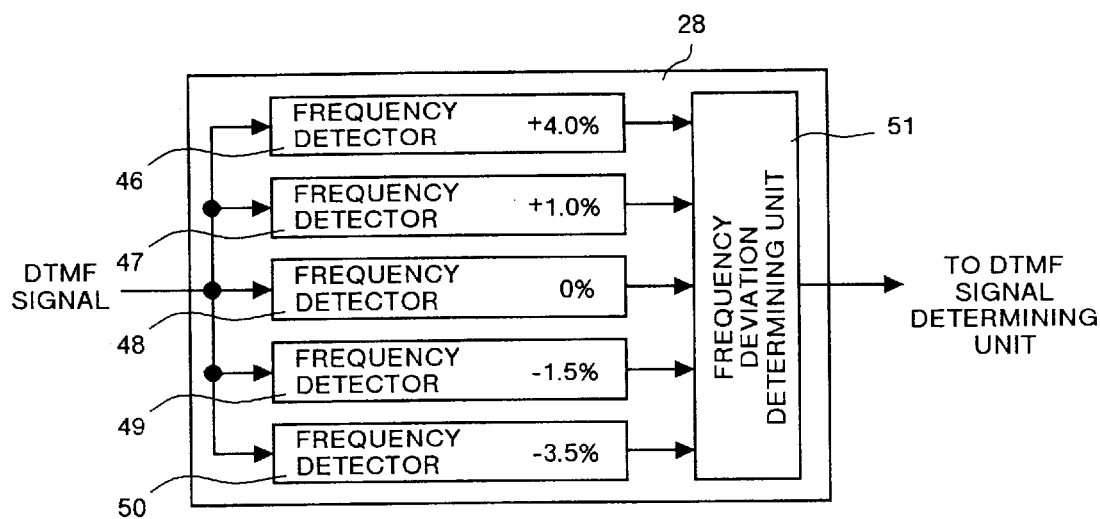
FIG. 3 is a block diagram showing general configuration of a frequency deviation detector for detecting signal strength and frequency deviation of a high frequency group according to Embodiment 1.

FIG. 3 is a block diagram showing general configuration of a frequency deviation detector for detecting signal strength and frequency deviation of the high frequency group according to Embodiment 1. The frequency deviation detectors 28 to 31, 36 to 39 for detecting signal strength and frequency deviation of the high frequency group have the same configuration as each other, and, similarly to the frequency deviation detectors for detecting signal strength and frequency deviation of the low frequency group, each has a plurality of frequency detectors for detecting signal strength of a prescribed frequency as well as of frequencies around the frequency; and a frequency deviation determining unit for determining whether each frequency deviation is within the prescribed frequency deviation allowed in DTMF specifications or not.

For example, the frequency deviation detector 28 comprises a frequency detector 46 for subjecting a frequency increased by 4.0% of the prescribed frequency 1209 Hz, namely 1209×1.04=1257.36 Hz, to DFT using the Goertzel algorithm to detect signal strength thereof. Similarly, the frequency deviation detector 28 comprises a frequency detector 47 for detecting signal strength of a frequency increased by 1.0% of the prescribed frequency 1209 Hz; a frequency detector 48 for detecting signal strength of the prescribed frequency 1209 Hz; a frequency detector 49 for detecting signal strength of a frequency subtracted by 1.5% from the prescribed frequency 1209 Hz; a frequency detector 50 for detecting signal strength of a frequency subtracted by 3.5% from the prescribed frequency 1209 Hz; and a frequency deviation determining unit 51 for determining whether frequency deviation in the prescribed frequency 1209 Hz of the received signal is within the prescribed frequency deviation allowed in DTMF standards or not from the results of detection by the frequency detector 46 to frequency detector 50.

Figure 4:
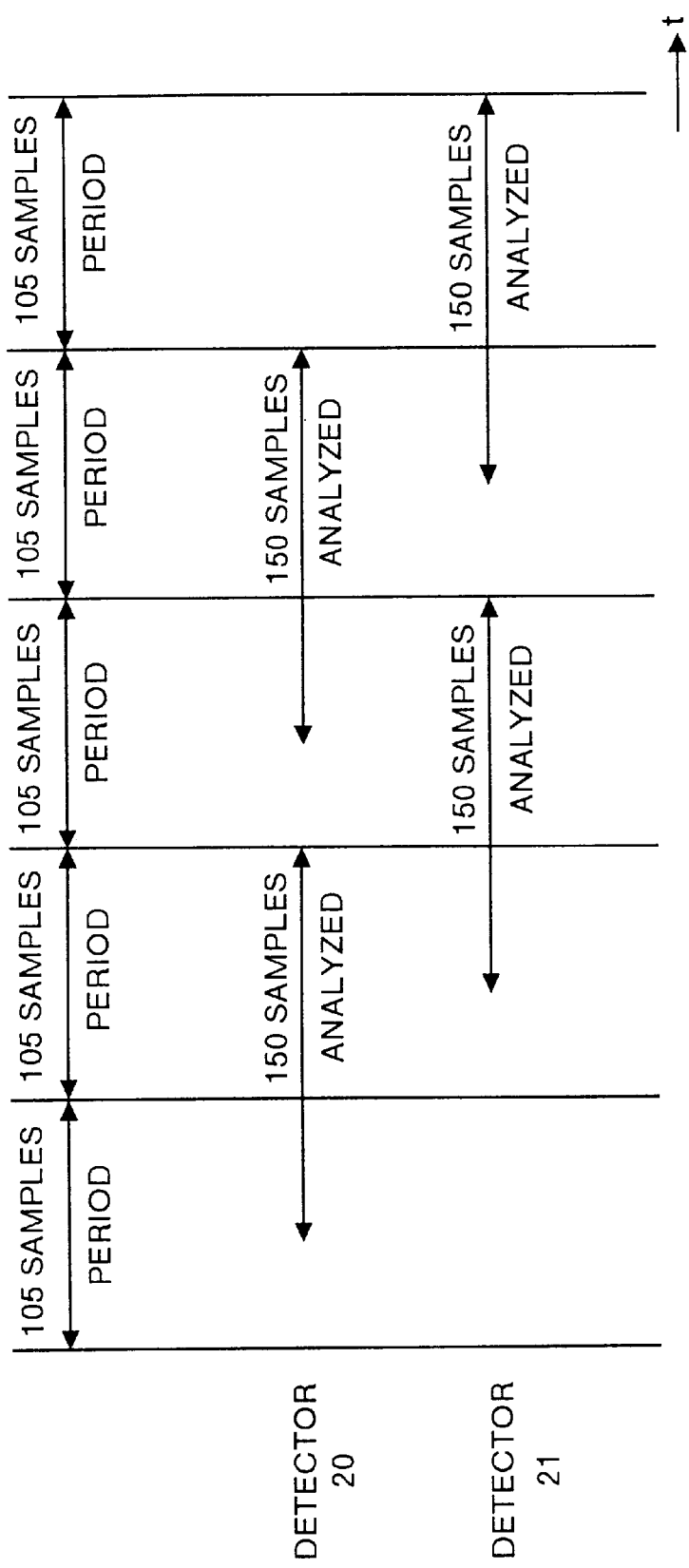
FIG. 4 is an explanatory view showing the operations of the frequency deviation detecting apparatus according to Embodiment 1.

Description is made, in the configuration described above, for an operation in Embodiment 1 with reference to FIG. 4 to FIG. 7. FIG. 4 is an explanatory view showing the operations of the frequency deviation detecting apparatus according to Embodiment 1. In the operation of the frequency deviation detecting apparatus according to Embodiment 1, at first, a received signal subjected to 8 kHz sampling is inputted into the frequency deviation analyzer 20 and frequency deviation analyzer 21. The frequency deviation analyzer 20 and frequency deviation analyzer 21 operate discretely, each of which analyzes frequencies using 150 samples in a row of received signals, and detects signal strength and frequency deviation of each prescribed frequency in DTMF. Analytical blocks in two frequency deviation analyzers, namely analytical blocks each with 150 samples used for detecting signal strength and frequency deviation of each prescribed frequency are displaced from and overlaid with one another, and either one of the frequency deviation analyzer 20 and frequency deviation analyzer 21 generates a result of detection for each 105 samples in the same manner as that based on the conventional technology.

With the operation described above, each of the frequency deviation analyzer 20 and frequency deviation analyzer 21 can ensure a sufficient analytical block, such as around 150 samples, analyze frequencies with high frequency precision of 1.8%, and, at the same time, the frequency deviation analyzer 20 and frequency deviation analyzer 21 as a whole can maintain a high-analytical throughput for each 105 samples.

Each of the frequency deviation detectors in the frequency deviation analyzer 20 and frequency deviation analyzer 21 analyzes frequency components around each of corresponding prescribed frequencies on data for 150 samples in a row using the Goertzel algorithm, and detects frequency deviation. More specifically, at first, the five frequency detectors inside each frequency deviation detector detect, in the case of the high frequency group, frequency components of a plus 3.0% frequency of the prescribed frequency, a plus 1.0% frequency thereof, a 0.0% frequency (prescribed frequency), a minus 1.5% frequency thereof, and a minus 3.5% frequency thereof respectively. Then, the frequency deviation determining unit determines whether the frequency deviation is within the standards or not according to results of detection from the five frequency detectors.

Computation of DFT using the Goertzel algorithm in the above mentioned frequency deviation detector may successively be executed each time a sample of a received signal is received, or may be divided and executed at intervals of receiving samples at the point of time some samples are stored, or may be executed once at the end of the analytical block. Strength of the frequency component may be detected using any algorithm other than the Goertzel algorithm. Furthermore, computation of DFT may be speeded up using a DSP (Digital Signal Processor) as a frequency deviation detector for speeding up the calculations.

The DTMF signal determining unit 23 receives results of determination on signal strength as well as frequency deviation of each DTMF frequency (prescribed frequency) from the frequency deviation analyzer 20 and the frequency deviation analyzer 21 for every 105 samples, determines whether the received signals are DTMF signals or not from results of measurement of each frequency deviation as well as from strength (signal strength) of each of the frequency components obtained by using the highest frequency component in the low frequency group and the highest frequency component in the high frequency group, and outputs a result of determination for each 105 samples to the 5-bit bus 22.

Figure 5:
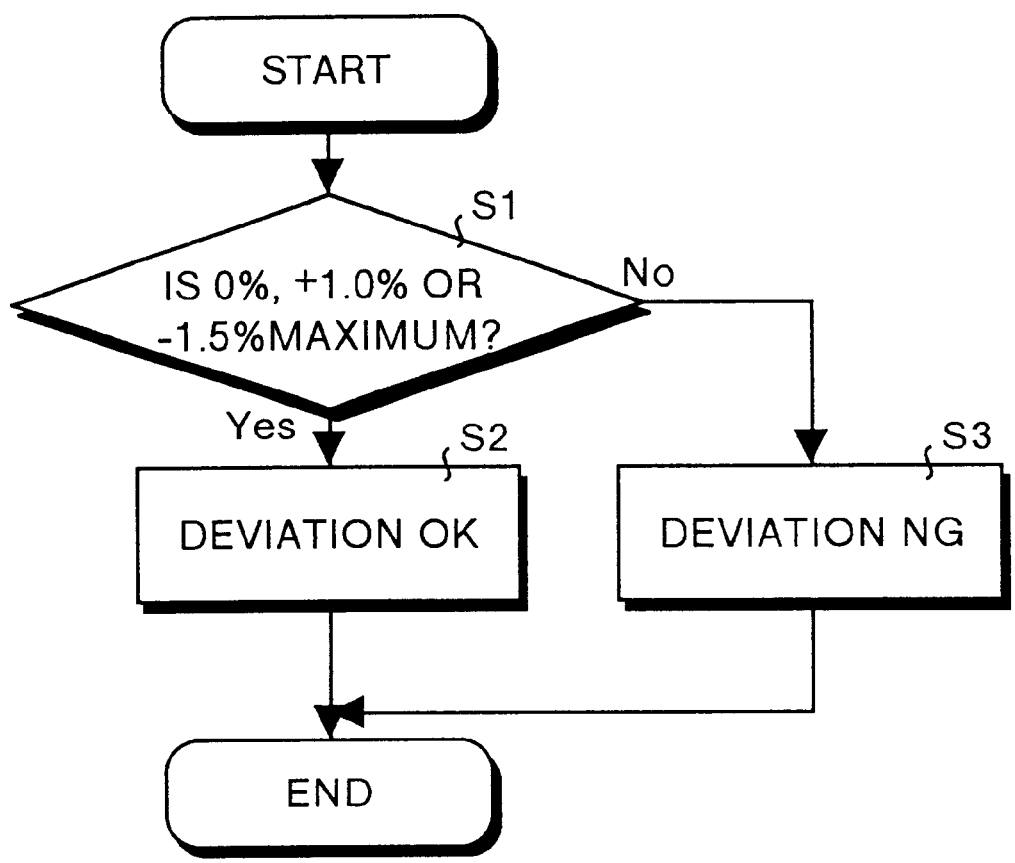
FIG. 5 is a flow chart showing a flow of operations of determination in a frequency deviation determining unit according to Embodiment 1.

Operations for determination in the frequency deviation determining unit are explained below with reference to FIG. 5 to FIG. 7. FIG. 5 is a flow chart showing a flow of the operations for determination in the frequency deviation determining unit according to Embodiment 1, FIG. 6 is a graph showing an example of frequency characteristics of a received signal when it is determined by the frequency deviation determining unit according to Embodiment 1 that the signal is within the standards, and FIG. 7 is a graph showing an example of frequency characteristics of a received signal when it is determined by the frequency deviation determining unit according to Embodiment 1 that the signal is out of the standards.

Figure 6:
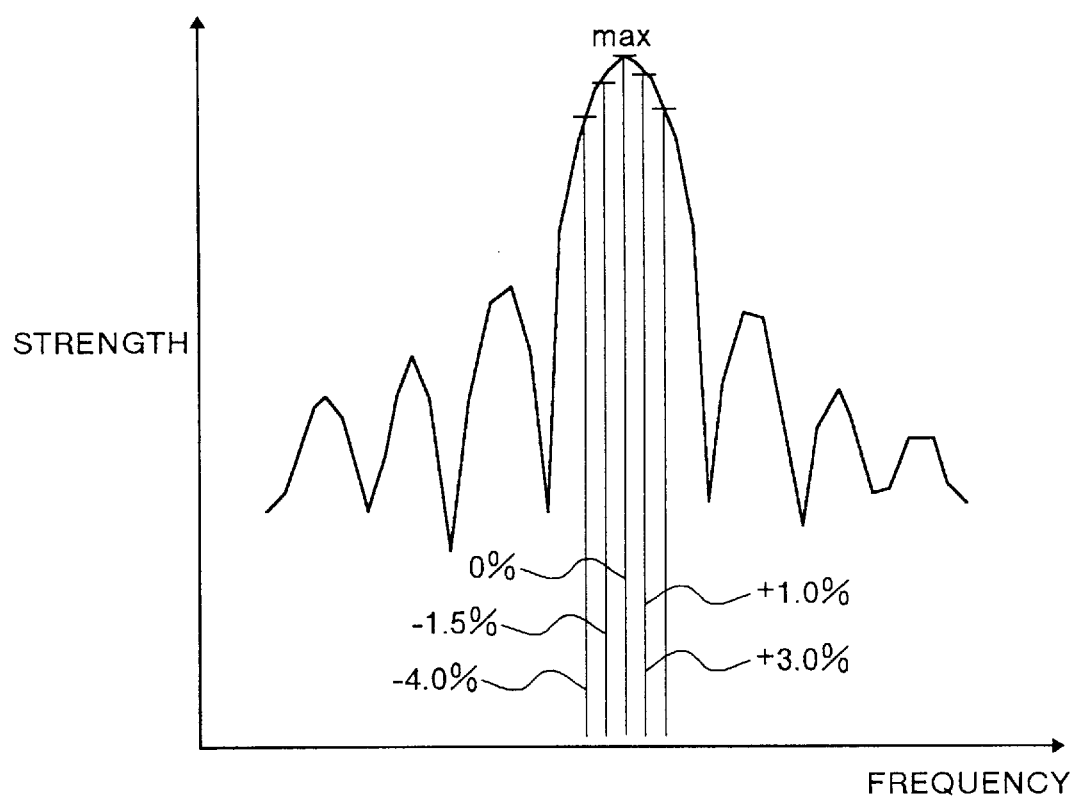
FIG. 6 is a graph showing an example of frequency characteristics of a received signal when it is determined by the frequency deviation determining unit according to Embodiment 1 that the signal is within standards.
Figure 7:
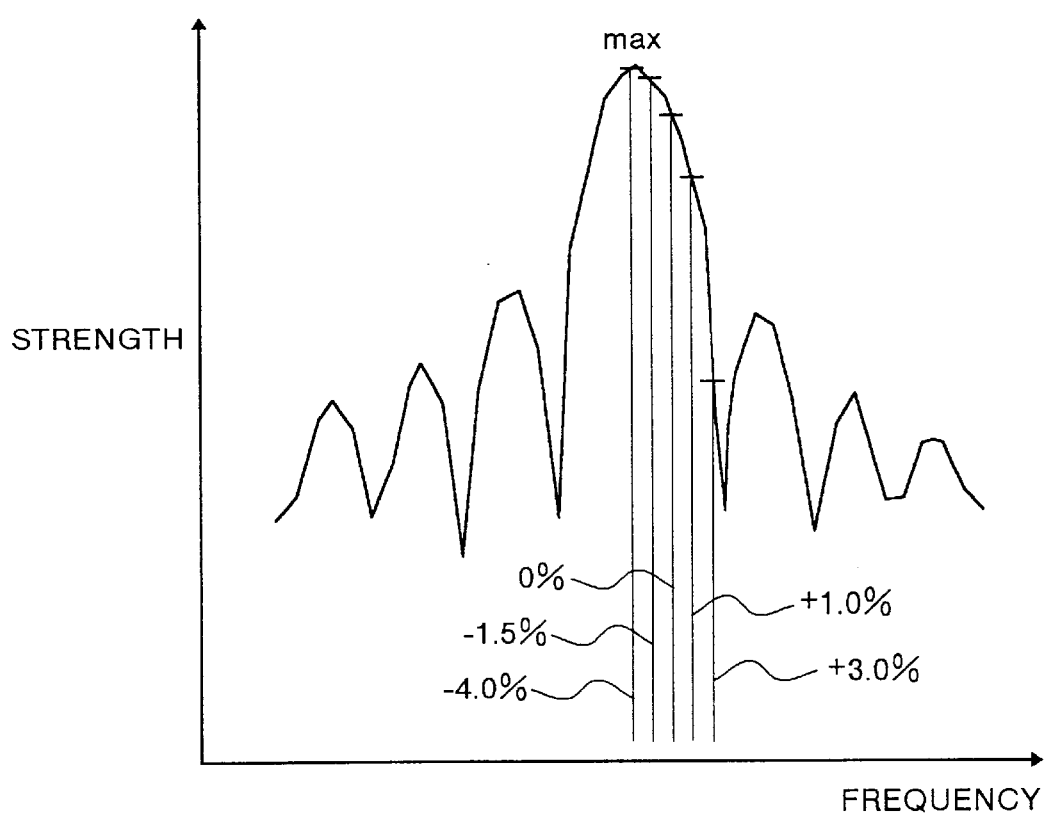
FIG. 7 is a graph showing an example of frequency characteristics of a received signal when it is determined by the frequency deviation determining unit according to Embodiment 1 that the signal is out of standards.

For example, the frequency deviation determining unit 45 compares five results of determination from the frequency detector 40 to frequency detector 44 with each other, determines whether the signal strength of a frequency is close to the prescribed frequency, namely the prescribed frequency, frequency increased by 1.0% of the prescribed frequency, or frequency subtracted by 1.5% from the prescribed frequency is the highest signal strength of the five results of determination or not (S1), determines, when it is determined that any of them is the highest signal strength, that the frequency deviation is within the standards as shown in FIG. 6, and outputs a signal indicating that the frequency deviation is within the specifications to the DTMF signal determining unit 23. On the other hand, when any of the three frequencies closest to the prescribed frequency does not have the highest signal strength, as shown in FIG. 7, the frequency deviation determining unit 45 determines that the frequency deviation is outside of the standards, and outputs a signal indicating that the frequency deviation is outside of the standards to the DTMF signal determining unit 23. The other frequency deviation determining units also perform the above mentioned operation.

As described above, with Embodiment 1, a plurality of frequency deviation analyzers 20, 21 analyze components of frequencies around the frequencies (697, 770, 852, 941, 1209, 1336, 1447, and 1633 Hz) prescribed in DTMF in analytical blocks each having a length (150 samples obtained by 8-kHz sampling) sufficient to analyze the components with a high frequency precision of around 1.8%, which is demanded in DTMF, detect frequency deviation, displace the analytical blocks in the frequency deviation analyzer 20 and the frequency deviation analyzer 21 from each other to overlay with one another, and detect frequency deviation at high-analytical throughput (around 105 samples obtained by 8 kHz sampling). Therefore the frequency deviation detecting apparatus can detect appropriate frequency deviation by ensuring sufficient precision to detect prescribed frequency deviation while at least one analytical block is ensured within the minimum duration of a DTMF signal.

Figure 8:
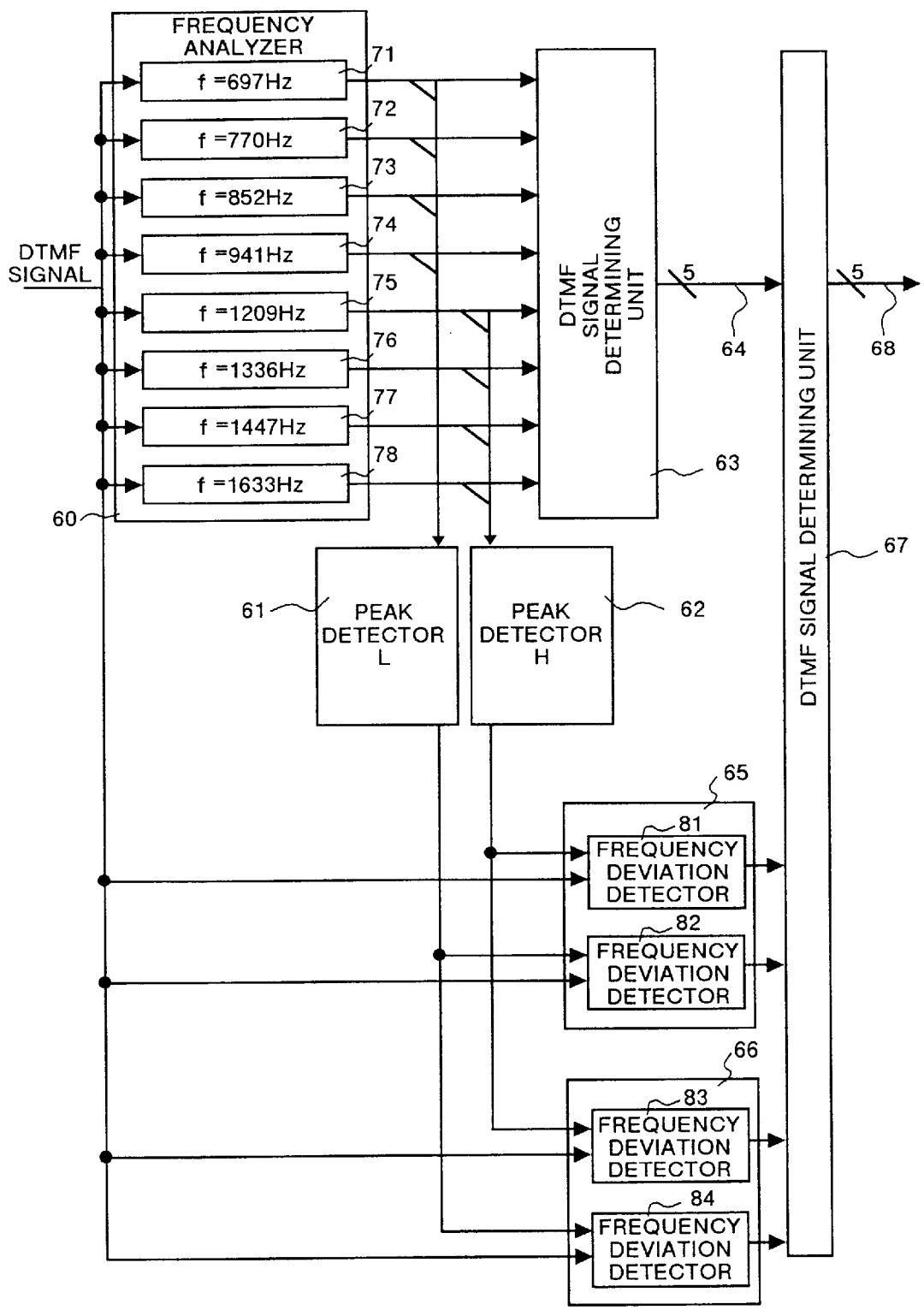
FIG. 8 is a block diagram showing a general configuration of a frequency deviation detecting apparatus according to Embodiment 2 of the present invention.

FIG. 8 is a block diagram showing general configuration of a frequency deviation detecting apparatus according to Embodiment 2 of the present invention. A DTMF receiver (frequency deviation detecting apparatus) according to Embodiment 2 comprises a frequency analyzer 60 for analyzing frequencies of a received signal; a peak detector 61 for receiving results of analysis by the frequency analyzer 60 and detecting a frequency with the highest signal strength of the low frequency group (697, 770, 852, 941 Hz) prescribed in DTMF; a peak detector 62 for receiving results of analysis by the frequency analyzer 60 and detecting a frequency with the highest signal strength of the high frequency group (1209, 1336, 1447, and 1633 Hz) prescribed in DTMF; a DTMF signal determining unit 63 for receiving results of analysis from the frequency analyzer 60 to determine whether the signal is a DTMF signal or not, and outputting a result of determination to a 5-bit bas 64; frequency deviation analyzers 65, 66 for analyzing frequencies around the low frequency group detected by the peak detector 61 and frequencies around the high frequency group detected by the peak detector 62 to detect frequency deviation respectively; and a DTMF signal determining unit 67 for receiving results of determination in the DTMF signal determining unit 63 transmitted via the 5-bit bus 64 as well as results of detection of frequency deviation in the frequency deviation analyzer 65 and frequency deviation analyzer 66, and determining whether the received signal is a DTMF signal or not and outputting the result of determination to the 5-bit bus 68.

The frequency analyzer 60 comprises frequency detector 71 to frequency detector 78 for detecting signal strength of the high frequency group and low frequency group prescribed in DTMF. The frequency detector 71 to the frequency detector 78 operate in the same manner as each other, and detect strength (signal strength) of frequency components of each corresponding prescribed frequency using the Goertzel algorithm. Herein, the frequency detector 71 to the frequency detector 78 detect, similarly in the conventional type of frequency detector, signal strength for every 105 samples in a 8 kHz cycle to output results of detection to the DTMF signal determining unit 63, and detect signal strength in first 60 samples out of 105 samples to output the signal strength to the peak detector 61 and the peak detector 62.

The frequency deviation analyzer 65 and the frequency deviation analyzer 66 have the same configuration as each other, each of which comprises a frequency deviation detector 81 and a frequency deviation detector 83 each for detecting frequency deviation of the high frequency group;

and a frequency deviation detector 82 and a frequency deviation detector 84 each for detecting frequency deviation of the low frequency group.

Figure 9:
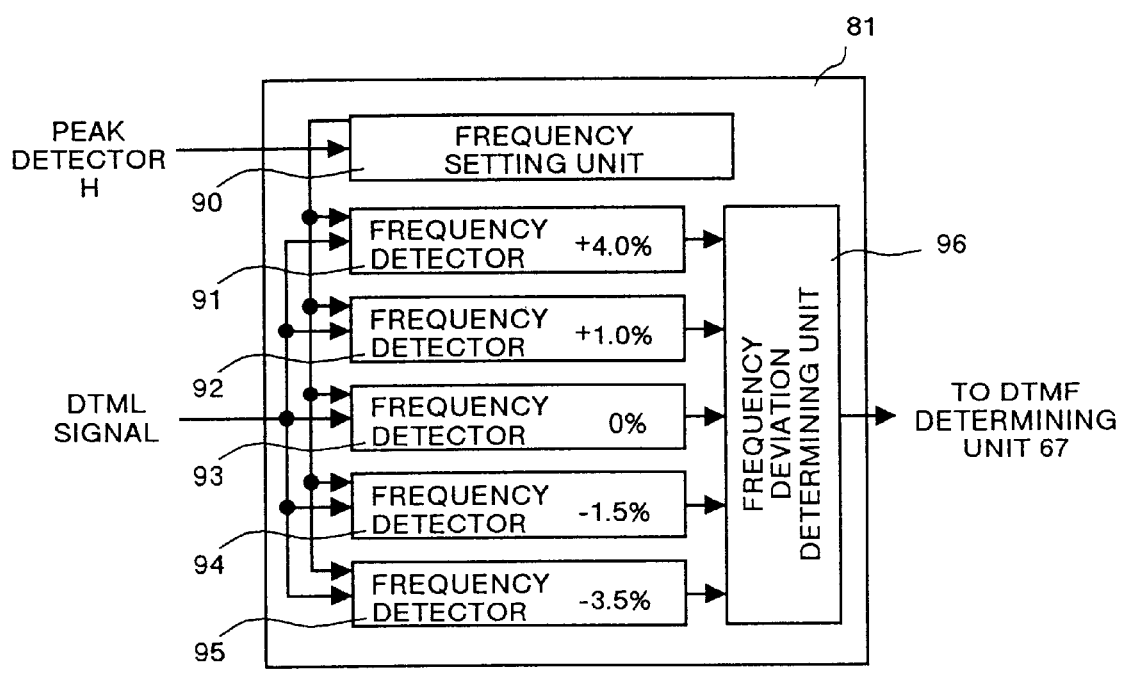
FIG. 9 is a block diagram showing general configuration of a frequency deviation detector for a high frequency group according to Embodiment 2.

FIG. 9 is a block diagram showing a general configuration of the frequency deviation detector for the high frequency group according to Embodiment 2. The frequency deviation detector 81 and the frequency deviation detector 83 each for the high frequency group have the same configuration as each other, and for example, the frequency deviation detector 81 comprises a frequency setting unit 90 for receiving a signal indicating which frequency component of the high frequency group has the highest signal strength from the peak detector 62 to set a prescribed frequency with the highest signal strength; frequency detector 91 to frequency detector 95 each for receiving a signal, and detecting signal strength of a plus 4.0% frequency set in the frequency setting unit 90, a plus 1.0% frequency, a 0.0% frequency (set frequency), a minus 1.5% frequency, and a minus 3.5% frequency respectively; and a frequency deviation determining unit 96 for determining whether the frequency deviation of the received signal is within an allowable range of the frequency deviation prescribed in the DTMF standards or not to output a result of determination to the DTMF signal determining unit 67.

Figure 10:
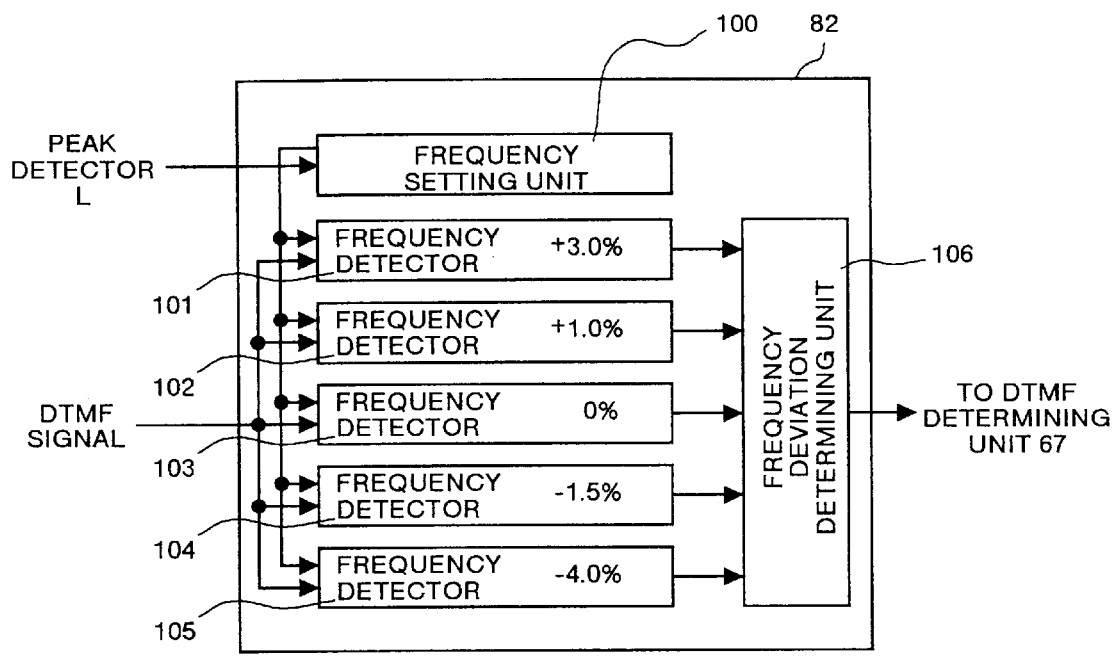
FIG. 10 is a block diagram showing general configuration of a frequency deviation detector for a low frequency group according to Embodiment 2.

FIG. 10 is a block diagram showing a general configuration of the frequency deviation detector for the low frequency group according to Embodiment 2. The frequency deviation detector 82 and the frequency deviation detector 84 each for the low frequency group have the same configuration as each other, and similarly to the frequency deviation detectors for the high frequency group, for example, the frequency deviation detector 84 comprises a frequency setting unit 100 for receiving a signal indicating which frequency component of the low frequency group has the highest signal strength from the peak detector 61 to set a prescribed frequency with the highest signal strength; frequency detector 101 to frequency detector 105 each for receiving a signal, and detecting signal strength of a plus 3.0% frequency set in the frequency setting unit 100, a plus 1.0% frequency, a 0.0% frequency (set frequency), a minus 1.5% frequency, and a minus 4.0% frequency respectively; and a frequency deviation determining unit 106 for determining whether the frequency deviation of the received signal is within an allowable range of the frequency deviation prescribed in the DTMF standards or not to output a result of determination to the DTMF signal determining unit 67.

Figure 11:
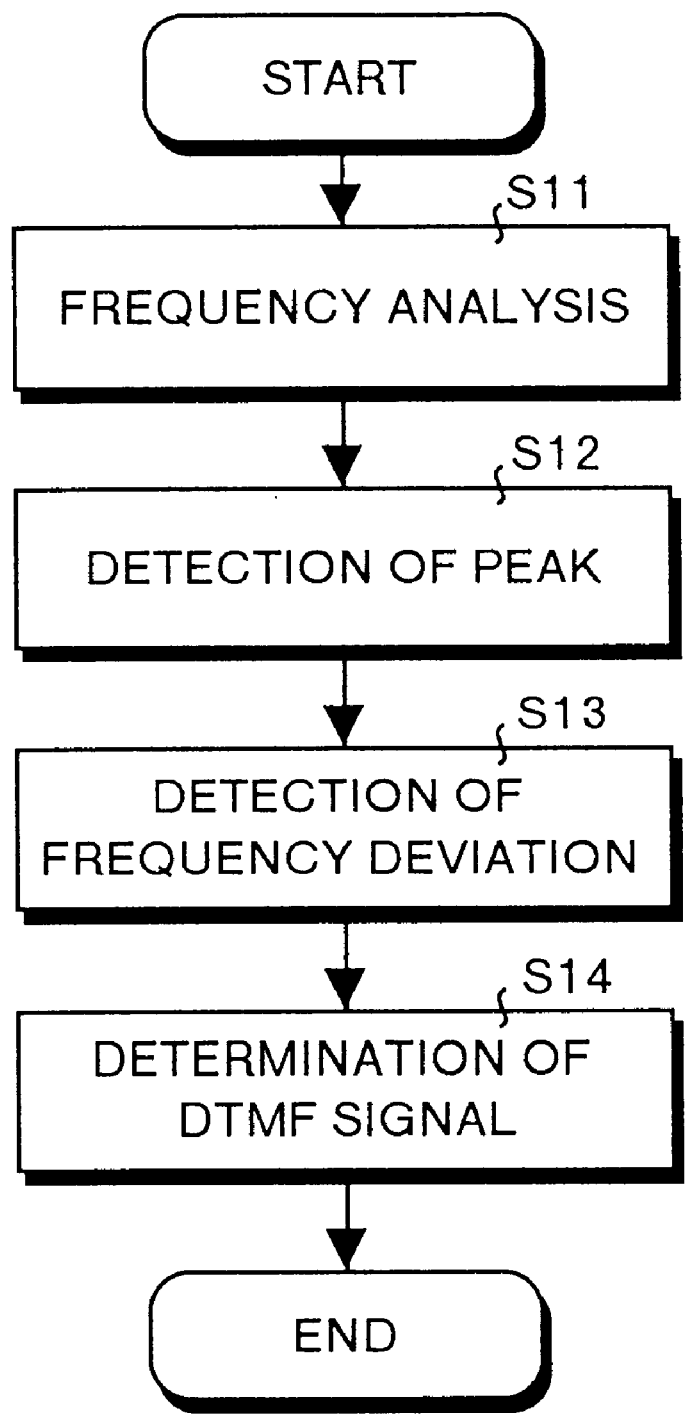
FIG. 11 is a flow chart showing a flow of operations of the frequency deviation detecting apparatus according to Embodiment 2.
Figure 12:
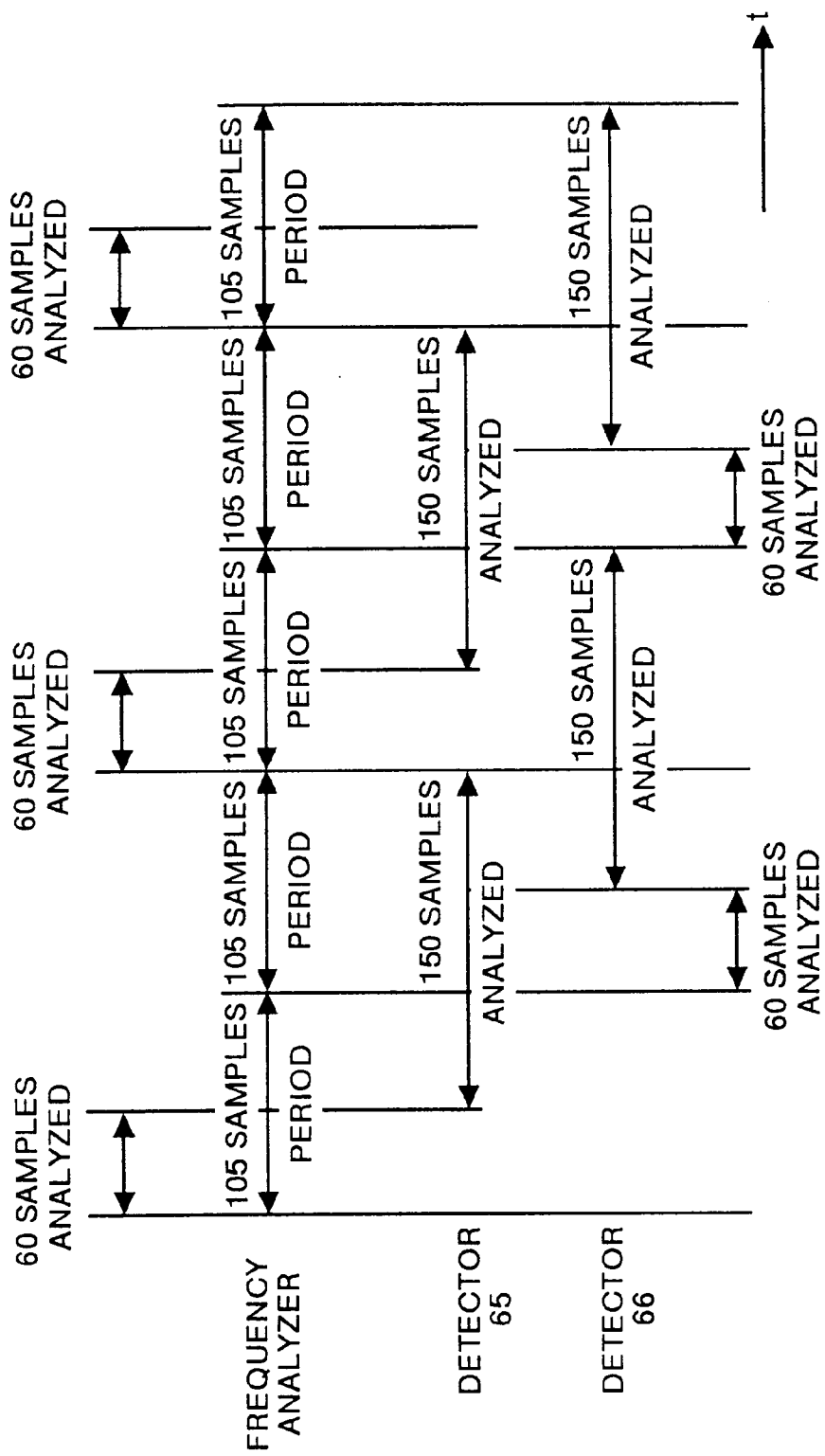
FIG. 12 is an explanatory view showing the operations of the frequency deviation detecting apparatus according to Embodiment 2.
Figure 14:
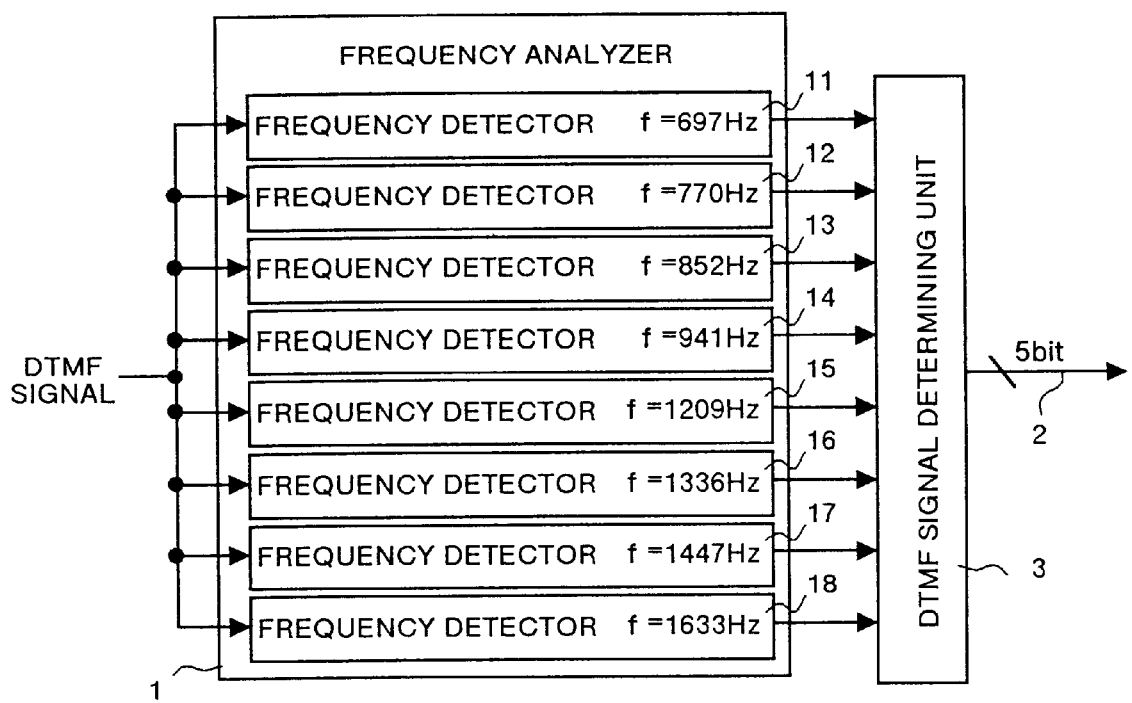
FIG. 14 is a block diagram showing general configuration of a DTMF receiver based on the conventional technology.
Figure 15:
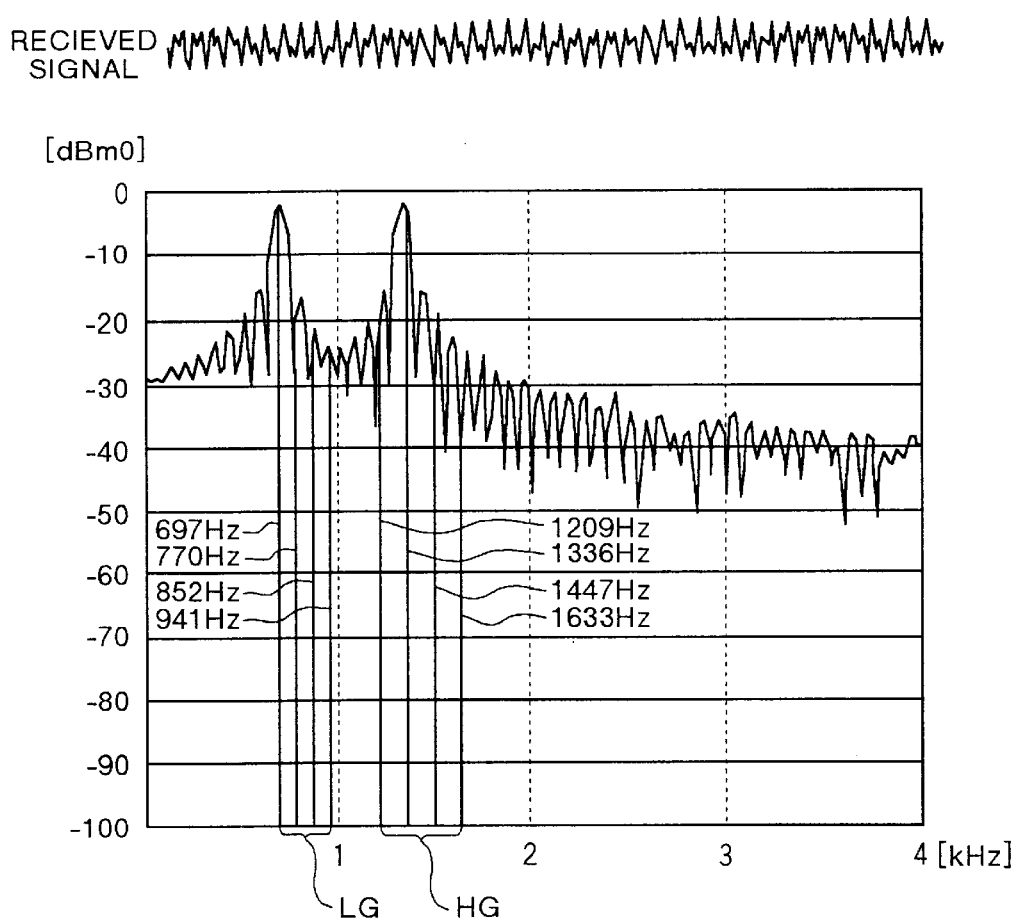
FIG. 15 is a graph showing an example of a received signal based on the conventional technology.
Figure 16:
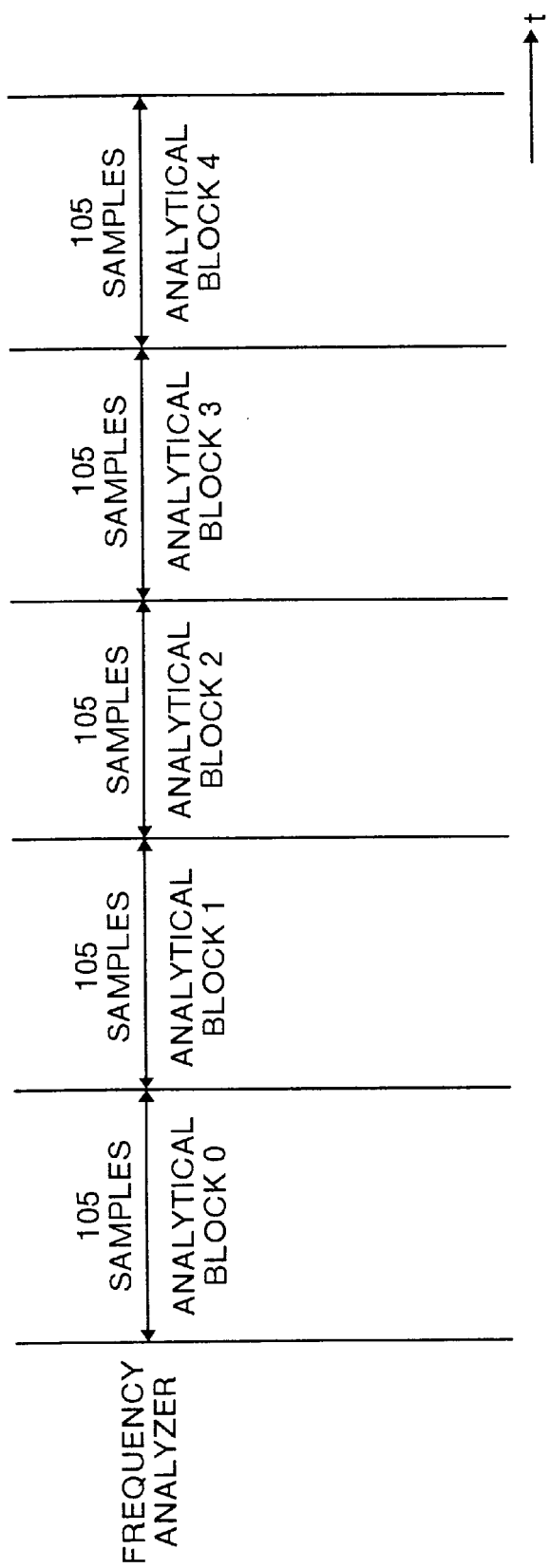
FIG. 16 is an explanatory view showing the operations of the DTMF receiver based on the conventional technology.

Description is made, in the configuration described above, for an operation in Embodiment 2 with reference to FIG. 11 and FIG. 12. FIG. 11 is a flow chart showing a flow of the operation of the frequency deviation detecting apparatus according to Embodiment 2, and FIG. 12 is an explanatory view showing the operation of the frequency deviation detecting apparatus according to Embodiment 2. In the operation of the frequency deviation detecting apparatus according to Embodiment 2, at first, a received signal is inputted into the frequency analyzer 60, frequency deviation analyzer 65, and frequency deviation analyzer 66.

The frequency analyzer 60 analyzes frequencies of the received signal using the Goertzel algorithm in each analytical block with 105 samples at a 8 kHz sampling rate, and detects the signal strength of each prescribed frequency to output the signal strength to the DTMF signal determining unit 63. Herein, signal strength of each prescribed frequency for the first 60 samples is detected using the 60-th sample from the beginning of the analytical block having 105 samples, and results of detection for the low frequency group detected in the frequency detector 71 to frequency detector 74 are outputted to the peak detector 61, while results of detection for the high frequency group detected in the frequency detector 75 to frequency detector 78 are outputted to the peak detector 62 (S11). Herein, the analytical block with 60 samples is sufficient enough to roughly determine which DTMF signal (prescribed frequency) is mainly included in the received signal, therefore an analytical block for frequency deviation can be ensured longer by detecting signal strength in an analytical block with samples less than 105 samples.

Computation of DFT using the Goertzel algorithm in the above mentioned frequency analyzer 60 may successively be executed each time a sample of a received signal is received, or may be divided and executed at intervals of receiving samples at the point of time some samples are stored, or may be executed once at 60-th sample. Furthermore, computation of DFT may be speeded up using a DSP (Digital Signal Processor) as a frequency analyzer 60.

Each of the peak detector 61 and the peak detector 62 receive results of detection from the frequency analyzer 60, compares the signal strength of frequencies of the low frequency group with the signal strength of frequencies of the high frequency group, detect frequencies with each highest signal strength of the low frequency group as well as of the high frequency group, and output results of detection to the frequency deviation analyzer 65 as well as to the frequency deviation analyzer 66 (S12). The frequency deviation analyzer 65 and frequency deviation analyzer 66 start analysis alternately at detecting timings of the peak detector 621 and peak detector 62, analyze only frequencies around the low frequency group and high frequency group detected by the peak detector 61 and peak detector 62 in an analytical block having 150 samples, and detect frequency deviation (S13).

Herein, when the frequency deviation analyzer 65 and the frequency deviation analyzer 66 store therein samples of a received signal before results of detection are inputted from the peak detector 61 and peak detector 62 and signal strength is computed together after results of detection are received from the peak detector 61 and peak detector 62, the analytical blocks of the frequency deviation analyzer 65 and frequency deviation analyzer 66 can be overlaid with the analytical blocks of the frequency analyzer 60. The frequency deviation detecting method is the same as that of Embodiment 1, therefore description thereof is omitted herein.

The DTMF signal determining unit 63 detects strength, twist, and S/N ratio or the like of a DTMF signal according to the strength (signal strength) of the frequency component of DTMF outputted from the frequency analyzer 60 for every 105 samples, and outputs, when all the detected data satisfies the standards of DTMF, a result of which DTMF signal (prescribed frequency) is detected to the DTMF signal determining unit 67 via the 5-bit bus 64. The DTMF signal determining unit 67 receives a result of determination outputted from the DTMF signal determining unit 63 which is similar to that of the conventional technology and results of detection of frequency deviation outputted from the frequency deviation analyzer 65 and frequency deviation analyzer 66, and outputs, when it is found that both of the data satisfy the standards of DTMF, information that the DTMF signal is detected to the 5-bit bus 68 (S14).

As described above, with Embodiment 2, similarly to Embodiment 1, analytical blocks each with around 150 samples which are longer enough in the frequency deviation analyzer 65 and frequency deviation analyzer 66 are displaced and overlaid with each other, therefore the frequency deviation detecting apparatus can detect appropriate frequency deviation by ensuring sufficient precision to detect the prescribed frequency deviation while at least one analytical block is ensured within the minimum lifetime of a DTMF signal. In addition, the frequency deviation detecting apparatus detects the specified frequency with DTMF previously included in the received signal, and detects frequency deviation only for the detected frequencies, therefore amount of computation, memory capacity, number of components and hence the circuit scale can be reduced, thus cost-down can be realized.

In Embodiment 1 and Embodiment 2, two frequency deviation analyzers are provided, each of the analytical blocks of these frequency deviation analyzers is set to around 150 samples at 8 kHz sampling rate, displacement of these analytical blocks is allowed by around 105 samples, or frequencies included mainly in a received signal in an analytical block with 60 samples is detected. However, the number of the analyzers is not limited to two, but three or more of frequency deviation analyzers may be provided, and any type of system may be allowable on condition that data satisfies the standards of DTMF.

As described above, with the present invention, a received signal is analyzed for frequency components around prescribed frequencies in a plurality of analytical blocks each with such a length that precision sufficient enough to detect the prescribed frequency deviation can be acquired, and the analytical blocks are displaced from and overlaid with each other so that at least one analytical block is ensured within the minimum lifetime of a DTMF signal, therefore appropriate frequency deviation can be detected by ensuring sufficient precision to detect the prescribed frequency deviation while at least one analytical block is ensured within the minimum lifetime of a DTMF signal.

With another aspect of the present invention, a received signal is analyzed for frequency components of a plurality of prescribed frequencies, which combination of a high frequency group with a low frequency group forming a prescribed frequency is mainly included in the received signal is detected, and only components of frequencies around the detected high frequency group and low frequency group are analyzed for detection of frequency deviation, therefore amount of computation, memory capacity, and number of components and hence the circuit scale can be reduced, thus cost-down can be realized.

With another aspect of the present invention, displacement between analytical blocks for detection of frequency deviation has around 105 samples at 8 kHz sampling rate, and a length of the analytical block has around 150 samples at 8 kHz sampling rate, therefore appropriate frequency deviation can be detected by ensuring sufficient precision to detect the prescribed frequency deviation while at least one analytical block is ensured within the minimum lifetime of a DTMF signal.

With another aspect of the present invention, a received signal is analyzed for frequency components of a plurality of prescribed frequencies in an analytical block with around 60 samples at 8 kHz sampling rate that is longer enough to detect which frequency component of the prescribed frequency is included in the signal and is shorter than the analytical block based on the conventional technology, therefore a lesser time can be allocated to the analytical block for detection of frequency deviation as compared to the time allocated to the analytical block in conventional technology, which allows more appropriate frequency deviation to be detected.

With the frequency deviation detecting method according to another aspect of the present invention, a received signal is analyzed for components of frequencies around a prescribed frequency in a plurality of analytical blocks each with such a length that precision sufficient enough to detect prescribed frequency deviation can be acquired, and the plurality of analytical blocks are displaced from and overlaid with each another so that at least one analytical block is ensured within the minimum lifetime of a DTMF signal, therefore appropriate frequency deviation can be detected by ensuring sufficient precision to detect the prescribed frequency deviation while at least one analytical block is ensured within the minimum lifetime of a DTMF signal.

With another aspect of the present invention, the received signal is analyzed for frequency components of a plurality of prescribed frequencies, which combination of a high frequency group with a low frequency group forming a prescribed frequency is mainly included in the received signal is detected, and only components of frequencies around the detected high frequency group and low frequency group are analyzed for detection of frequency deviation, therefore amount of computation, memory capacity, and number of components and hence the circuit scale can be reduced, thus cost-down can be realized.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A frequency deviation detecting apparatus for detecting frequency deviation of a dual tone multiple frequency (DTMF) signal comprising a plurality of frequency deviation analyzing units, each frequency deviation analyzing unit analyzing a received signal for frequency components proximate a fixed number of DTMF frequencies in alternating first and second analytical blocks, the first analytical blocks having a length of 60 samples for performing a coarse frequency deviation analysis and the second analytical blocks having a length of 150 samples for performing precision frequency deviation analysis, wherein each of the second analytical blocks corresponding to one of said plurality of frequency deviation analyzing units partially overlaps a second analytical block corresponding to another of said plurality of frequency deviation analyzing units, and a frequency deviation analysis result is produced by at least one of said plurality of frequency deviation analyzing units for every 105 samples.

2. The frequency deviation detecting apparatus according to claim 1 further comprising:

a frequency analyzing unit for analyzing the received signal for frequency components at the DTMF frequencies;

a detecting unit for detecting which combination of a signal in a high frequency group and a signal in a low frequency group constituting a fixed dual tone is mainly included in the received signal according to analysis of said frequency analyzing unit, wherein said plurality of frequency deviation analyzing units analyze only a received signal for components of frequencies proximate frequencies of the high frequency group and frequencies of the low frequency group detected by said detecting unit.

3. A frequency deviation detecting method for detecting frequency deviation of a dual tone multiple frequency (DTMF) signal comprising analyzing a received signal in a plurality of frequency deviation analyzing units for frequency components proximate a fixed number of DTMF frequencies in analytical blocks, the analytical blocks of each frequency deviation analyzing unit having equal lengths to ensure a precision required for detecting frequency deviation from one of the DTMF frequencies, wherein each of the analytical blocks overlays part of another analytical block and the received signal is analyzed in more than one analytical block during a minimum duration of the DTMF signal.

4. The frequency deviation detecting method according to clam 3 further comprising detecting, by analyzing the received signal for frequency components at the DTMF frequencies, which combination of a signal in a high frequency group and a signal in a low frequency group constituting a fixed dual tone is mainly included in the received signal, wherein only components of frequencies proximate the frequencies of the high frequency group and frequencies of the low frequency group detected are analyzed.

5. A frequency deviation detecting apparatus for detecting frequency deviation of a dual tone multiple frequency (DTMF) signal comprising a plurality of frequency deviation analyzing units, each frequency deviation analyzing unit analyzing a received signal for frequency components proximate a fixed number of DTMF frequencies in analytical blocks, the analytical blocks of each frequency deviation analyzing unit having equal durations longer than minimum duration of the received signal, wherein each of the analytical blocks corresponding to one of the plurality of said frequency deviation analyzing units overlays part of an adjacent block corresponding to another of said plurality of frequency deviation analyzing units, and a result is generated from at least one of the frequency deviation analyzing units with a period equal to the minimum duration of the received signal.

6. The frequency deviation detecting apparatus according claim 5, wherein the duration of each analytical block equals around 150 samples at an 8 kHz sampling rate, and the minimum duration of the received signal equals around 105 samples at an 8 kHz sampling rate.

7. The frequency deviation detecting apparatus of claim 2, wherein the high frequency group includes frequencies of 1209, 1336, 1447, and 1633 Hz, and said detecting unit detects signal strength of frequencies +4%, +1%, −1.5%, and −3.5% of those frequencies in the high frequency group.

8. The frequency deviation detecting apparatus of claim 2, wherein the low frequency group includes frequencies of 697, 770, 852, and 941 Hz, and said detecting unit detects signal strength of frequencies +3%, +1%, −1.5%, and −4% of those frequencies in the low frequency group.

9. A frequency deviation detecting apparatus for detecting frequency deviation of a dual tone multiple frequency (DTMF) signal comprising:

a plurality of frequency deviation analyzing units, each frequency deviation analyzing unit analyzing a received signal for frequency components proximate a fixed number of DTMF frequencies in analytical blocks, the analytical blocks of each frequency deviation analyzing unit having equal durations longer than minimum duration of the received signal, wherein each of the analytical blocks corresponding to one of the plurality of said frequency deviation analyzing units overlays part of an adjacent block corresponding to another of said plurality of frequency deviation analyzing units, and a result is generated from at least one of the frequency deviation analyzing units with a period equal to the minimum duration of the received signal; and a detecting unit for detecting signal strength of the received signal at frequencies in a high frequency group and a low frequency group, wherein the high frequency group includes frequencies of 1209, 1336, 1447, and 1633 Hz, and said detecting unit also detects signal strength of frequencies +4%, +1%, −1.5%, and −3.5% of those frequencies in the high frequency group, and the low frequency group includes frequencies of 697, 770, 852, and 941 Hz, and said detecting unit also detects signal strength of frequencies +3%, +1%, −1.5%, and −4% of those frequencies in the low frequency group.

* * * * *